(12) United States Patent
Sandeman et al.

(10) Patent No.: US 8,109,100 B2
(45) Date of Patent: Feb. 7, 2012

(54) MAGNETOCALORIC REFRIGERANT

(75) Inventors: Karll Sandeman, Cambridge (GB); Neil Wilson, Cambridge (GB)

(73) Assignees: Karl Sandeman, Cambridge (GB); Camfridge Ltd, Cambridge (GB)

( * ) Notice: Subject to any disclaimer, the term of this patent is extended or adjusted under 35 U.S.C. 154(b) by 713 days.

(21) Appl. No.: 12/088,481

(22) PCT Filed: Sep. 28, 2006

(86) PCT No.: PCT/GB2006/003619
§ 371 (c)(1), (2), (4) Date: Dec. 24, 2008

(87) PCT Pub. No.: WO2007/036729
PCT Pub. Date: Apr. 5, 2007

(65) Prior Publication Data
US 2009/0158749 A1    Jun. 25, 2009

(30) Foreign Application Priority Data
Sep. 29, 2005    (GB) .................................. 0519843.7

(51) Int. Cl.
*F25B 21/00* (2006.01)
(52) U.S. Cl. ............................................. 62/3.1; 62/467
(58) Field of Classification Search .................... 62/3.1, 62/3.6, 114, 438, 467; 148/108, 301, 306, 148/307
See application file for complete search history.

(56) References Cited

U.S. PATENT DOCUMENTS

| | | | |
|---|---|---|---|
| 5,365,743 A * | 11/1994 | Nagao et al. ................... 62/47.1 |
| 5,447,033 A * | 9/1995 | Nagao et al. ........................ 62/6 |
| 5,997,660 A * | 12/1999 | Jenner et al. ................... 148/301 |
| 6,363,727 B1 * | 4/2002 | Hashimoto et al. ................. 62/6 |
| 6,451,132 B1 * | 9/2002 | Walmer et al. ................. 148/303 |
| 6,589,366 B1 * | 7/2003 | Gschneidner et al. ........ 148/301 |
| 6,607,576 B1 * | 8/2003 | Sikka et al. ..................... 75/246 |
| 6,676,772 B2 * | 1/2004 | Saito et al. ..................... 148/301 |
| 6,849,195 B2 * | 2/2005 | Basheer et al. ............ 252/62.54 |
| 6,982,010 B2 * | 1/2006 | Liu ............................... 148/101 |

(Continued)

FOREIGN PATENT DOCUMENTS
EP    0 947 785    10/1999
(Continued)

OTHER PUBLICATIONS

International Search Report for PCT/GB2006/003619, mailed Feb. 1, 2007.
(Continued)

*Primary Examiner* — Mohammad Ali
(74) *Attorney, Agent, or Firm* — Nixon & Vanderhye P.C.

(57) ABSTRACT

The invention provides the use of a material of general formula (I):

$$[(A_yCo_{1-y})]u(Mn_{1-z}C_z)[(Si_{1-x}B_x)]v \quad (I)$$

as a magnetocaloric material, wherein the material is orthorhombic and wherein:
A is selected from Ni, Cr, Fe, Al, P, Se, Ga and Sb and mixtures thereof;
B is selected from Ge, Sn, Al, P, Se, Ga and Sb and mixtures thereof;
C is selected from Ni, Cr, Fe, Al, P, Se, Ga and Sb and mixtures thereof;
x, y and z are the same or different and are numbers in the range 0 to 0.2; and
u and v are the same or different and are numbers in the range 0.5 to 1.5. The invention also provides a method of making materials of formula (I) and a magnetocaloric refrigeration device comprising such materials.

25 Claims, 5 Drawing Sheets

U.S. PATENT DOCUMENTS

| | | | | |
|---|---|---|---|---|
| 7,069,729 | B2 * | 7/2006 | Bruck et al. | 62/3.1 |
| 2004/0079446 | A1 | 4/2004 | Kogure et al. | |
| 2004/0093877 | A1 * | 5/2004 | Wada et al. | 62/114 |
| 2004/0250550 | A1 * | 12/2004 | Bruck et al. | 62/3.1 |

FOREIGN PATENT DOCUMENTS

| | | |
|---|---|---|
| EP | 0 947 785 A1 | 10/1999 |
| WO | WO 2004/038055 | 5/2004 |
| WO | WO 2004/068512 | 8/2004 |

OTHER PUBLICATIONS

Written Opinion of the International Searching Authority, mailed Feb. 1, 2007.

Johnson V., et al., "Magnetic and Crystallographic Properties of Ternary Manganese Silicides with Ordered $Co_2P$ structure", Phys. Stat. Sol., vol. 20, No. 1, pp. 331-335, (Nov. 16, 1973).

Niziol S. et al., "Structure Magnétique des MnCoSi", Phys. Stat. Sol., vol. 45, No. 16, pp. 591-597, (Feb. 16, 1978).

Niziol S. et al., "Pressure Dependence of the Magnetic Transition Temperature of the $CoMnGe_{1-x}Si_x$ System", Journal of Magnetism and Magnetic Materials, vol. 79, pp. 333-337, (Jul. 1989).

Medvedeva et al, "Influence of pressure on the temperature of phase change in MnCoSi", Ukrainskii Fizicheskii Zhurnal 24 1752 (1979).

Binczycka et al, "Metamagnetism of CoMnSi", Phys. Stat. Sol. (a) 35 K69-K72 (1976).

Search Report dated Feb. 24, 2006, issued in connection with GB 0519843.7.

* cited by examiner

MAGNETOCALORIC REFRIGERANT

This application is the U.S. national phase of International Application No. PCT/GB2006/003619, filed 28 Sep. 2006, which designated the U.S. and claims priority to GB 0519843.7, filed 29 Sep. 2005, the entire contents of each of which are hereby incorporated by reference.

FIELD OF THE INVENTION

The invention relates to metallic materials and their use in magnetic refrigeration. In particular, it relates to metallic materials which demonstrate a magnetocaloric effect and a process for preparing them.

DESCRIPTION OF THE PRIOR ART

Magnetic refrigeration is based on the magnetocaloric effect, whereby a magnetic material changes temperature when exposed to a change in applied magnetic field. This physics offers the possibility of a more environmentally friendly alternative to conventional refrigeration. There are two aspects to the environmental benefits. First, magnetic refrigeration eliminates the need for greenhouse gases as refrigerants. Second, it is the only prototype refrigeration technology which is potentially more energy efficient than conventional refrigeration. The key to the improved efficiency lies in the reversible nature of the ideal magnetocaloric effect when compared to the inherent irreversibility of gas expansion, the physics behind the majority of conventional refrigerators.

In the magnetocaloric effect, a changing magnetic field is applied to a material. The effect of the field is to control the degree of magnetic order, changes in which heat or cool the crystal lattice. An applied magnetic field can cause an increase or decrease in the temperature of the material. In either case, a cooling effect can be derived from cycling the field applied to the magnetocaloric refrigerant from zero to a maximum value and back to zero, where heat is dumped from the heat load to the refrigerant material when the latter is cold and heat is removed from the refrigerant by a heat exchanger during the part of the cycle where the refrigerant is hottest. The useful cooling effect is a function of both the starting temperature and the maximum magnetic field applied. As the maximum field applied is increased, the cooling capacity of the material is increased through a combination of an increase in its operating range of temperature and/or the size of the cooling effect at any one temperature. The magnetocaloric effect is largest around rapid changes in magnetic order, or magnetic transitions. An example of such a transition is the magnetic disordering temperature, or Curie temperature of iron (770° C.). Its magnetocaloric effect is not large, though, partly because the change of magnetic order is relatively smooth.

Historically, the magnetocaloric effect has been used to cool experimental apparatus from 4 Kelvin to even lower temperatures. However, work in the last 10 years on complex materials such as $Gd_5Si_2Ge_2$, has demonstrated giant magnetocaloric effects near sharp magnetic transitions that occur over a wide range of temperatures extending above room temperature. Initial excitement following these discoveries has been tempered by limitations in these magnetocaloric materials which mean that it is currently not possible to mass produce magnetic refrigerators economically. These concerns include cost (expensive rare earth constituents, e.g. in Gd and $Gd_5Si_2Ge_2$), large magnetic hysteresis which limits the efficiency of the cooling cycle, for example in martensitic Heuslers such as $Ni_2MnGa$, toxic elemental constituents as in $MnFeAs_xP_{1-x}$) and a narrow range of effective operating temperatures (limiting the number of applications which can be satisfied with a single material composition).

Assessment of the magnetic properties of other materials have also been carried out. For example, the metamagnetic transition temperature of CoMnSi has been investigated, but the material has never been suggested for use as a magnetocaloric material. The zero-field value of the metamagnetic transition temperature, $T_t$, of this material has in fact been shown to vary widely. For example, Medvedeva et al, Ukrainskii Fizicheskii Zhurnal 24 1752 (1979) quotes a value of 260 K in a 1 Tesla field whilst early work by Bińczycka et al, Phys. Stat. Sol. (a) 35 K69 (1976) found values as low as 207 K in samples grown by co-melting elemental Co, Mn and Si, followed by annealing at 1273 K and rapid quenching.

The wide variation in the magnetic properties obtained according to the prior art means that there remains a need to provide additional materials which can be used in the field of magnetic refrigeration. For example, materials are needed which demonstrate consistent properties and which are economical to produce. Materials are also required which show reduced hysteresis, and which are suitable for providing a magnetocaloric effect close to room temperature.

SUMMARY OF THE INVENTION

In accordance with the invention there is provided the use of a material of general formula (I):

$$[(A_yCo_{1-y})]_u(Mn_{1-z}C_z)[(Si_{1-x}B_x)]_v \qquad (I)$$

as a magnetocaloric material, wherein the material is orthorhombic and wherein:
  A is selected from Ni, Cr, Fe, Al, P, Se, Ga and Sb and mixtures thereof;
  B is selected from Ge, Sn, Al, P, Se, Ga and Sb and mixtures thereof;
  C is selected from Ni, Cr, Fe, Al, P, Se, Ga and Sb and mixtures thereof;
  x, y and z are the same or different and are numbers in the range 0 to 0.2; and
  u and v are the same or different and are numbers in the range 0.5 to 1.5.

The invention also provides a process for preparing a material of general formula (I) comprising the following steps:
  (a) providing Co, Mn, Si, and optionally A, B and C, in amounts sufficient to produce a material of formula (I):

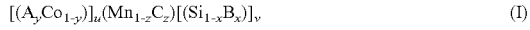
$$[(A_yCo_{1-y})]_u(Mn_{1-z}C_z)[(Si_{1-x}B_x)]_v \qquad (I)$$

wherein:
  A is selected from Ni, Cr, Fe, Al, P, Se, Ga and Sb and mixtures thereof;
  B is selected from Ge, Sn, Al, P, Se, Ga and Sb and mixtures thereof;
  C is selected from Ni, Cr, Fe, Al, P, Se, Ga and Sb and mixtures thereof;
  x, y and z are the same or different and are numbers in the range 0 to 0.2; and
  u and v are the same or different and are numbers in the range 0.5 to 1.5
  (b) co-melting the metals provided in step (a) under an inert atmosphere;
  (c) cooling the mixture of molten materials obtained in step (b);
  (d) annealing the material at a temperature of from 825 to 975° C.;
  (e) slowly cooling the material from step (d) to 825° C. or below; and (f) optionally, if the material from step (e) is above room temperature, further cooling the material to room temperature.

The invention also provides a magnetocaloric material produced according to the process above, as well as a magnetocaloric refrigeration device comprising a magnetocaloric material described above. In accordance with the invention, a large magnetocaloric effect is achieved over a wide operating temperature with low magnetic hysteresis. Furthermore, the process provides materials having high consistency of features.

DETAILED DESCRIPTION OF THE INVENTION

Figure 1:
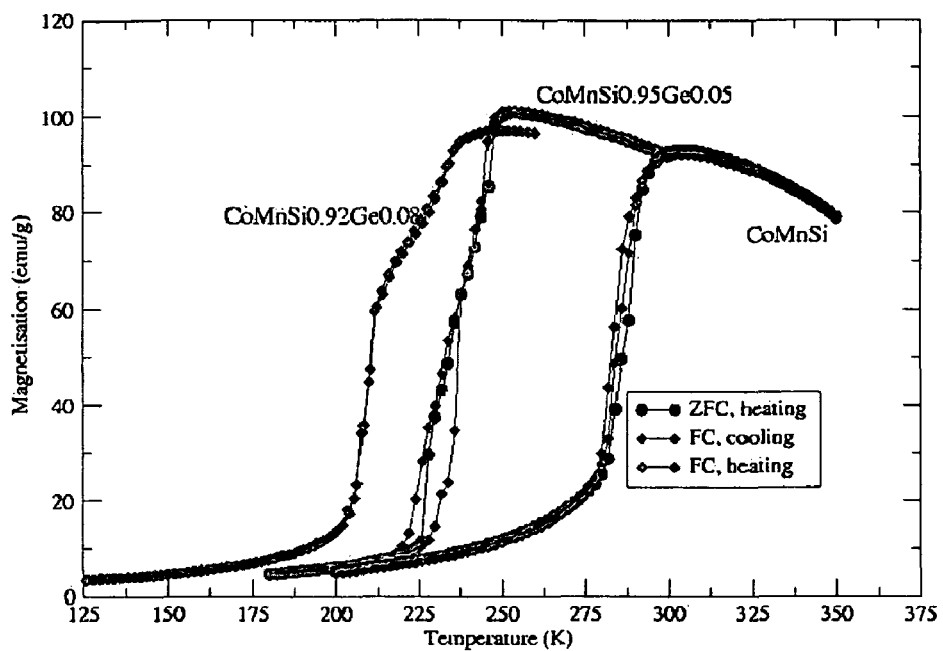
FIG. 1 shows the temperature dependence of materials used in the invention in a magnetic field of 3 Tesla.

In the materials used in the unit cell is orthorhombic in structure. The positions of the atoms within the unit cell may be defined by the space group Pnma. The material used in the invention is thus in contrast to known materials such as those in WO-A-2004/068512 which are hexagonal. As will be appreciated, in orthorhombic systems the axes defining the unit cell are all at 90° to one another, whereas in a hexagonal form two of the axes are equal at 90° and the other is at 120°. When dopants are included in the materials used in the invention they at least partially replace the Co, Mn and Si atoms within the structure. This may cause a change in volume of the unit cell, with the space group being preserved.

The metals A, B and C are dopants used in order to tune the properties of the material, e.g. the field and temperature dependence of the metamagnetic transition with which the large magnetocaloric effect is associated. Metal A is doped at the cobalt site in the material, metal B is doped at the silicon site in the material and metal C is doped at the manganese site in the material, while still retaining the orthorhombic structure of the material. The dopants are preferably present in relatively small amounts, with x, y and z preferably ranging from 0 to 0.1. It should be noted that with this range and other ranges used in the following description, the end points of the range are included. Thus, when x is described as "ranging from" being "in the range" 0 to 0.1, then this includes x being 0 and x being 0.1. A, B and C can be included at higher levels than 0.1, but it is generally preferred to limit the amount of dopant in order to observe the magnetocaloric effect at room temperature, and/or to reduce cost and retain the desirable properties of the undoped material.

In one embodiment of the invention x, y and z are zero, hence metals A, B and C are absent and the material used in the invention represents CoMnSi.

In other embodiments metal A and/or metal B and/or metal C can be present. Thus, in one embodiment, at least one of x, y and z is greater than zero. Preferably one of x and y is greater than zero. Alternatively z may be greater than zero and x and y may be zero. In one embodiment when one of x, y and z is greater than zero, one or both of the other of x, y and z is/are zero.

Preferably x is from 0 to 0.1, for example about 0.05 or about 0.08. Preferably y is from 0 to 0.1, for example about 0.05. Preferably z is also from 0 to 0.1, for example z is 0. In another embodiment z is about 0.05.

As mentioned above, dopant A is selected from Ni, Cr, Fe, Al, P, Se, Ga and Sb and mixtures thereof, for example No, Fe, Al, P, Se, Ga and Sb and mixtures thereof. Particularly preferred dopants for A are Ni and Fe. When A is a mixture of such metals, then y refers to the total level of dopant A. For example, when A is a mixture of Ni and Fe, then y refers to the total level of these two dopants, i.e. the level of (Ni+Fe).

Similarly, dopant B is selected from Ge, Sn, Al, P, Se, Ga and Sb and mixtures thereof. Particularly preferred dopants for B are Ge and Sn. When B is a mixture of such metals, then x refers to the total level of dopant B. For example, when B is a mixture of Ge and Sn, then x refers to the total level of these two dopants, i.e. the level of (Ge+Sn).

As mentioned above, dopant C is selected from Ni, Cr, Fe, Al, P, Se, Ga and Sb and mixtures thereof, for example Ni, Fe, Al, P, Se, Ga and Sb and mixtures thereof. When C is a mixture of such materials, then z refers to the total level of dopant C. For example, when C is a mixture of Se and Ga, then z refers to the total level of these two dopants, i.e. the level of (Se+Ga). In one embodiment, preferably z is zero and dopant C is not present in the material. In another embodiment preferably z is not zero, and dopant C is present. In this embodiment preferably C is Fe.

The values of u and v can be changed within the range of from 0.5 to 1.5 in order to allow for different ratios of the $(A_yCo_{1-y})$, $(Mn_{1-z}C_z)$ and $(Si_{1-x}B_x)$ components. The values of u and v can be the same or different, and are preferably from 0.8 to 1.2, more preferably from 0.95 to 1.05, more preferably 0.99 to 1.01. Thus, while different levels of the components $(A_yCo_{1-y})$, $(Mn_{1-z}C_z)$ and $(Si_{1-x}B_x)$ are allowed, it is preferred that these components are present at approximately the same level. In a preferred embodiment both u and v are 1, and thus the $(A_yCo_{1-y})$, $(Mn_{1-z}C_z)$ and $(Si_{1-x}B_x)$ components are present in a 1:1:1 molar ratio.

Preferred embodiments of the invention are those wherein the material is of general formula (II):

$$(A'_yCo_{1-y})_uMn(Si_{1-x}B'_x)_v \quad \quad (II)$$

wherein A' is selected from Ni and Fe and mixtures thereof, B is selected from Ge and Sn and mixtures thereof, x is a number in the range 0 to 0.2, y is a number in the range 0 to 0.2, u is a number in the range 0.5 to 1.5, and v is a number in the range 0.5 to 1.5. Preferred values of x, y, u and v are discussed above. Most preferably A' is Ni. Most preferably B' is Ge.

In a preferred embodiment both u and v are 1. Thus, preferred materials for use in the invention are those according to general formula (III):

$$(A'_yCo_{1-y})Mn(Si_{1-x}B'_x) \quad \quad (III)$$

wherein A', B', x and y are as defined above in relation to formula (II).

Particularly suitable materials include those where x is zero, e.g. those of formula $(Ni_yCo_{1-y})MnSi$ and $(Fe_yCo_{1-y})MnSi$, with the former being preferred.

Other suitable materials include those where y is zero, e.g. those of formula $CoMn(Si_{1-x}Ge_x)$ or $CoMn(Si_{1-x}Sn_x)$, with the former being most preferred.

According to another preferred embodiment of the invention, the material is of formula (IV):

$$Co_u(Mn_{1-z}C'_z)Si_v \qquad (IV)$$

wherein C is selected from Ni, Cr, Fe, Al, P, Se, Ga and Sb and mixtures thereof, z is a number in the range 0 to 0.2, u is a number in the range 0.5 to 1.5 and v is a number in the range 0.5 to 1.5. Preferably C is Fe. Preferred values of u and v are as discussed above. Preferably z is about 0.05.

Small levels of impurities may also be present in the materials of the invention, usually due to the particular processes used to prepare them or the purities of the starting materials. The impurities are preferably present at very low levels, for example at a level of less than 1 wt %, more preferably less than 0.5 wt % such as less than 0.1 wt %. The most common impurity is likely to be oxygen.

The materials used in the invention as defined above are advantageous in that the field at which the metamagnetic transition occurs can be brought to a level within the range of permanent magnets, for example down to a level of approximately 1 Tesla. This has clear advantages in terms of widespread application of these materials.

The materials described above are suitable for application across a wide range of temperatures, for example from about 150 to about 350 K. In particular, they are useful for applications at around room temperature and, as mentioned above, refrigeration around this temperature can be provided with the aid of permanent magnets.

The invention also provides a material of general formula (I) as shown above wherein the material is orthorhombic and wherein:

A is selected from Ni, Cr, Fe, Al, P, Se, Ga and Sb and mixtures thereof;

B is selected from Ge, Sn, Al, P, Se, Ga and Sb and mixtures thereof;

C is selected from Ni, Cr, Fe, Al, P, Se, Ga and Sb and mixtures thereof;

x, y and z are the same or different and are numbers in the range of from 0 to 0.2 with the proviso that at least one of x, y and z is greater than zero; and u and v are the same or different and are numbers in the range of from 0.5 to 1.5.

According to this embodiment of the invention, preferably one of x and y is greater than zero. Alternatively, z may be greater than zero. When one of x, y and z is greater than zero, preferably one or both of the other of x, y and z is/are zero.

Preferably x, y and z are from 0 to 0.1 provided that at least one of x, y and z is greater than zero. Preferably at least one of x, y and z is from 0.01 to 0.2, more preferably from 0.03 to 0.1, more preferably from 0.04 to 0.09. In one embodiment z is zero, hence it is preferred that at least one of x and y is greater than zero. Suitable materials in this embodiment include those wherein z is zero, x is zero and y is from 0.03 to 0.1, or wherein z is zero, x is from 0.03 to 0.1 and y is zero. In another embodiment preferably z is greater than zero, more preferably from 0.03 to 0.1, more preferably about 0.05. In this embodiment preferably x and y are zero.

Preferred choices of dopants A, B and C are as defined earlier in relation to the uses of the invention. Similarly, preferred values of u and v are as defined earlier.

Preferred materials claimed in the invention are those wherein the material is of general formula (II):

$$(A'_yCo_{1-y})_uMn(Si_{1-x}B'_x)_v \qquad (II)$$

wherein the material is orthorhombic, A' is selected from Ni and Fe and mixtures thereof, B is selected from Ge and Sn and mixtures thereof, x is a number in the range 0 to 0.2, y is a number in the range 0 to 0.2, u is a number in the range 0.5 to 1.5, and v is a number in the range 0.5 to 1.5, with the proviso that one of x and y is greater than zero. Preferred values of x, y, u and v are discussed above. Most preferably A' is Ni. Most preferably B' is Ge.

More preferred materials claimed in the invention are those of general formula (III):

$$(A'_yCo_{1-y})Mn(Si_{1-x}B'_x) \qquad (III)$$

wherein the material is orthorhombic, and A', B', x and y are as defined above in relation to formula (II). Particularly suitable materials include those where x is zero and y is greater than zero, e.g. those of formula $(Ni_yCo_{1-y})MnSi$ and $(Fe_yCo_{1-y})MnSi$, with the former being preferred. Other suitable materials include those where y is zero, and x is greater than zero, e.g. those of formula $CoMn(Si_{1-x}Ge_x)$ or $CoMn(Si_{1-x}Sn_x)$, with the former being most preferred.

Other preferred materials claimed in the invention are those of general formula (IV):

$$Co_u(Mn_{1-z}C'_z)Si_v \qquad (IV)$$

wherein the material is orthorhombic, and C', u, v and z are as defined above in relation to formula (IV). Particularly suitable materials include those where z is about 0.05, for example those of formula $CoMn_{0.95}Fe_{0.05}Si$.

As with the claimed uses of the invention, small levels of impurities may also be present in the materials of the invention, usually due to the particular processes used to prepare them or the purities of the starting materials. The impurities are preferably present at very low levels, for example at a level of less than 1 wt %, more preferably less than 0.5 wt % such as less than 0.1 wt %. The most common impurity is likely to be oxygen.

Processes

Materials for use in the present invention and the materials of the invention can be prepared according to a process defined previously.

The metals are provided in step (a) in suitable weight proportions to produce a mixture that complies with formula (I). For example, if it is intended to prepare the material CoMnSi, then the constituent metals Co, Mn and Si will be provided in step (a) at a 1:1:1 molar ratio. Metals A, B and C are provided where these are desired in the final product. The metals may be provided in the form of alloys (e.g. binary or higher mixtures) or in elemental form. It is preferred that they are provided in elemental form. The form of the metals can be any suitable form, for example rods, plates, powders etc. The preferred metals and relative quantities to be provided in step (a) are discussed earlier in the context of the material per se.

In accordance with the process, in step (b) the mixture of metals provided in step (a) is subsequently heated in order to melt the metals. The temperature to which the mixture is heated is not particularly critical, provided it is high enough to ensure that all of the metals are indeed melted. Suitable temperatures are of the order of 1000 to 1500° C., although the skilled person would readily be able to determine appropriate temperatures. This step is carried out under an inert atmosphere. The precise constitution of the inert atmosphere is not critical, but an inert atmosphere is required in order to ensure that there is no degradation of the materials or formation of contaminants. Suitable gases include argon, although a person skilled in the art will be able to identify other gases which provide the same inert atmosphere.

In step (c) the mixture of molten metals is cooled, for example down to room temperature, in order to render the mixture solid, e.g. in the form of an ingot. The specific rate of cooling is not critical, and has a negligible effect on the final product of the process. For example, in step (c) the mixture of molten metals may be quenched. This can be achieved by any suitable method known in the art, for example by quenching the material in water or by simply allowing the mixture to cool once the heating apparatus used in step (b) has been removed or switched off.

In step (d) the material is annealed. The annealing stage preferably lasts for a number of hours, for example at least 1 hour. More preferred annealing times are generally greater than 10 hours, more preferably greater than 50 hours, for example approximately 60 hours. Annealing times much greater than about 100 hours can be used, but it is generally preferred to anneal for up to or less than about 100 hours to prevent evaporation of more volatile components. The annealing temperature ranges from 825 to 975° C., but is preferably in the range 850 to 975° C., more preferably from 855 to 955° C., more preferably from 925 to 955° C., such as about 950° C.

In step (e) the material is slowly cooled to 825° C. or below. A further step (f), where the material from step (e) is further cooled to room temperature, is required only if the material is not cooled all the way to room temperature in step (e). The slow cooling step preferably occurs at a rate of up to about 1° C. per minute, more preferably at a rate of up to about 0.5° C. per minute, for example between 0.1 and 0.3° C. per minute. It is important to slowly cool to a temperature of 825° C. or below, more preferably to a temperature of 800° C. or below in order to ensure that the desired crystal structure is obtained. In an exemplary process in step (e) the material is slowly cooled, as described above, all of the way down to room temperature. However, if the material is not slowly cooled all of the way to room temperature, then the remainder of the cooling (down to room temperature) need not be carried out at such a slow cooling rate. Thus, at temperatures below 825° C., more preferably below 800° C., the material may be cooled quickly (e.g. by quenching the material) or may be cooled at the same or a similar rate as was used in step (e).

This process is reliable and consistently produces materials having the desired magnetic properties (for example in terms of temperature of the metamagnetic transition and its dependence on the magnetic field). Reproducibility is clearly advantageous in terms of utilising the invention on both a small and an industrial scale.

The process described above thus allows the preparation of materials having extremely consistent properties, which is a feature which has been lacking in the prior art.

The materials described above and those produced according to the process defined above are useful in a magnetic refrigeration device. Accordingly, the invention also provides a magnetic refrigeration device comprising a magnetocaloric material described above or produced according to the process described above. Suitable magnetocaloric refrigeration devices can be based on those known in the art, with an exemplary schematic refrigeration device being shown in FIG. 8. For example, the magnetocaloric refrigeration device may further comprise, in addition to the magnetocaloric material described above: (a) a first heat exchanger (hot heat exchanger); (b) a second heat exchanger (cold heat exchanger); (c) a heat exchange fluid (such as water, oil or antifreeze etc.); (d) one or more refrigeration components which contain at least a portion of the magnetocaloric material and which are arranged such that when the magnetocaloric material is within the refrigeration components it is in heat exchange contact with the heat exchange fluid; (e) means for providing a controlled magnetic field across the refrigeration components(s); and wherein the heat exchange fluid allowing heat transfer to occur with the first and second heat exchangers and the refrigeration component(s). With regard to part (d) above, the refrigeration component or components are preferably such as to allow the magnetocaloric material to be in contact with, or porous to, or for a suspension within the heat exchange fluid.

The invention will be described in the Examples which follow.

EXAMPLES

Example 1

Mn (AlfaAesar Research Chemicals Catalogue 4N stock# 36221) was electropolished in a 1:30 mixture of perchloric acid:methanol, chilled in a bath of solid $CO_2$. This was in order to remove the oxide coating. 0.9079 g of the resulting Mn, 0.9739 g of Co (AlfaAesar Research Chemicals Catalogue 3N5 stock# 42659) and 0.4641 g of Si (AlfaAesar Research Chemicals Catalogue 6N stock# 39101) were subsequently melted together under an argon atmosphere. The weight loss during this process was 0.3%. The material was then cooled to form an ingot. A part of the resulting ingot was annealed at a temperature of 950° C. for 60 hours and cooled to room temperature at a rate of 0.2° C. per minute. A number of different materials of general formula (I) were prepared in an analogous method to that mentioned above, as discussed in Examples 2 to 4.

Example 2

1.02774 g Mn, 1.10415 g Co, 0.49983 g Si and 0.06794 g Ge (AlfaAesar Research Chemicals Catalogue 6N stock# 11144) were co-melted as in Example 1 and the resulting ingot annealed identically. Weight loss was 1% and the ingot had nominal composition $CoMnSi_{0.95}Ge_{0.05}$.

Example 3

0.80748 g Mn, 0.86624 g Co, 0.37954 g Si and 0.08558 g Ge were co-melted as in Examples 1 and 2 and the resulting ingot annealed identically. Weight loss was 0.5% and the ingot had nominal composition $CoMnSi_{0.92}Ge_{0.08}$.

Example 4

1.3177 g Mn, 1,3428 g Co, 0.0702 g Ni and 0.6742 g Si were co-melted as before and annealed as before. The purities of Mn, Co and Si were are in the Examples above. The Ni was of 4N4 purity (99.994%) and was AlfaAesar Research Chemicals Catalogue stock# 12045. Weight loss was 0.3%. The ingot had a nominal composition $Co_{0.95}Ni_{0.05}MnSi$.

Example 5

0.7745 g Mn, 0.8744 g Co, 0.0415 g Fe and 0.4166 g Si were co-melted as before and annealed as before, with the exception that a hold temperature of 850° C. for 100 hours instead of 950° C. for 60 hours was used during annealing. Starting materials, apart from Si, were also different: Co was of 2N6 purity, Mn was 97.5% purity and Fe was of 4N purity (all from Goodfelllow). The ingot had a nominal composition of the CoMn$_{0.95}$Fe$_{0.05}$Si.

Example 6

Various properties such as the temperature and field dependence of magnetisation, magnetocaloric effect and refrigeration capacity were then determined.

FIG. 1 shows the temperature dependence of CoMnSi, CoMnSi$_{0.95}$Ge$_{0.05}$ and CoMnSi$_{0.92}$Ge$_{0.08}$ in a magnetic field of 3 Tesla. A small hysteresis of around 3 K can be seen.

Figure 2:
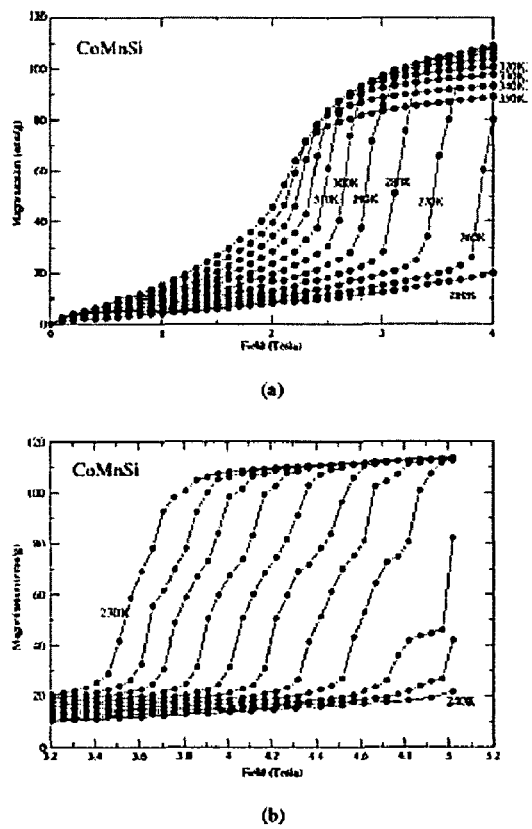
FIG. 2 shows the field dependence of the magnetisation ("M" in emu/g) of a material of the invention in fields of up to 5 Tesla.

FIG. 2 shows the field dependence of the magnetisation ("M" in emu/g) of CoMnSi in the temperature range 240 K to 350 K and in fields of up to 5 Tesla. There is a rapid change with temperature in the transition field at which the step in magnetisation takes place. This gives the material its broad range of operating temperature at high fields.

Figure 3:
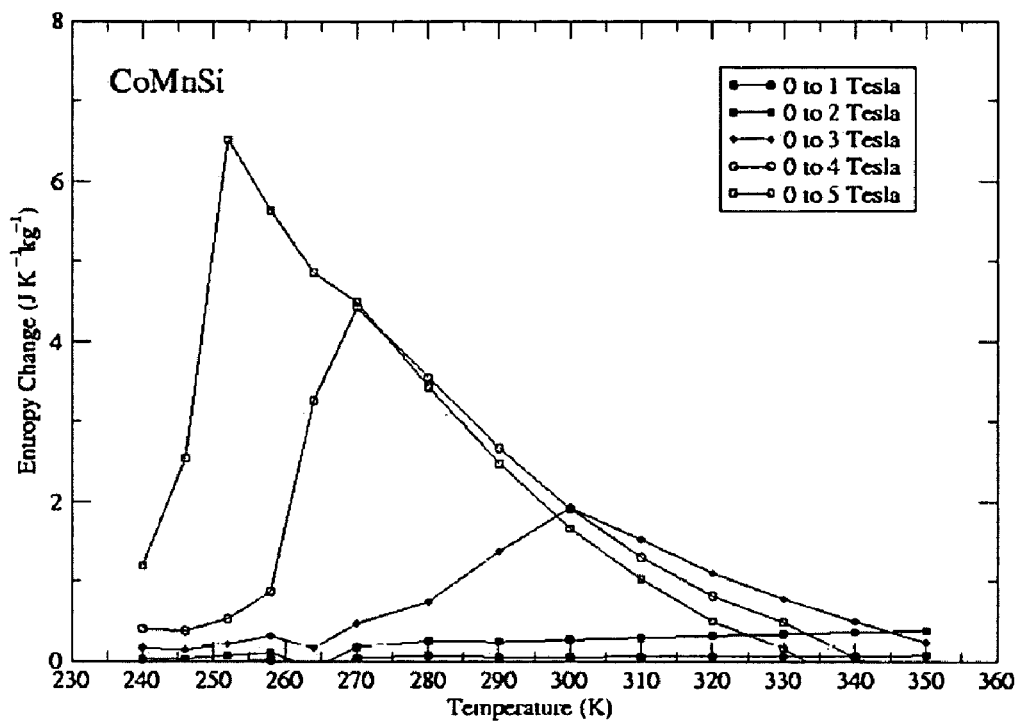
FIG. 3 depicts one measure of the magnetocaloric effect in terms of the entropy change, $\Delta S$, of a material of the invention caused by the application of magnetic fields of up to 5 Tesla.

FIG. 3 shows a measure of the magnetocaloric effect: the entropy change, ΔS of CoMnSi caused by the application of magnetic fields of up to 5 Tesla. This data is derived from that in FIG. 2.

From FIGS. 1 to 3, the benefits of the using CoMnSi-based materials over existing magnetocalorics can be seen: in FIG. 3, large values of entropy change and a wide range of temperatures over which sizeable entropy changes are seen. In FIG. 1 the size of the hysteresis (3 K) is small compared with range of temperatures over which a magnetocaloric effect can be seen.

Figure 4:
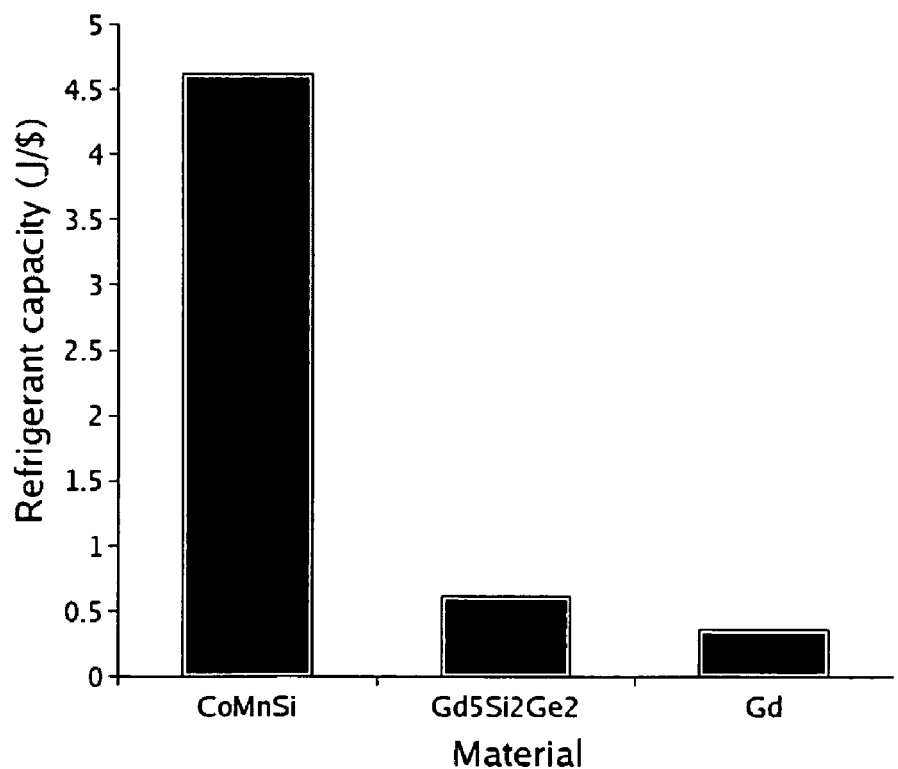
FIG. 4 shows the refrigeration capacity of the material of Example 2.

FIG. 4 shows the refrigeration capacity, q of CoMnSi in J/$ at a field of 3 Tesla. This is a figure by which the material CoMnSi may be compared with Gd$_5$Si$_2$Ge$_2$ and Gd, both benchmark magnetocaloric materials. The value q is calculated by integrating the entropy change from FIG. 3 over a 40 K window surrounding the peak in ΔS. The result is then divided by the cost per kilogram of the constituent elements of each material. As can be seen from FIG. 4, CoMnSi has the highest resulting figure of merit in an applied field of 3 Tesla.

Figure 5:
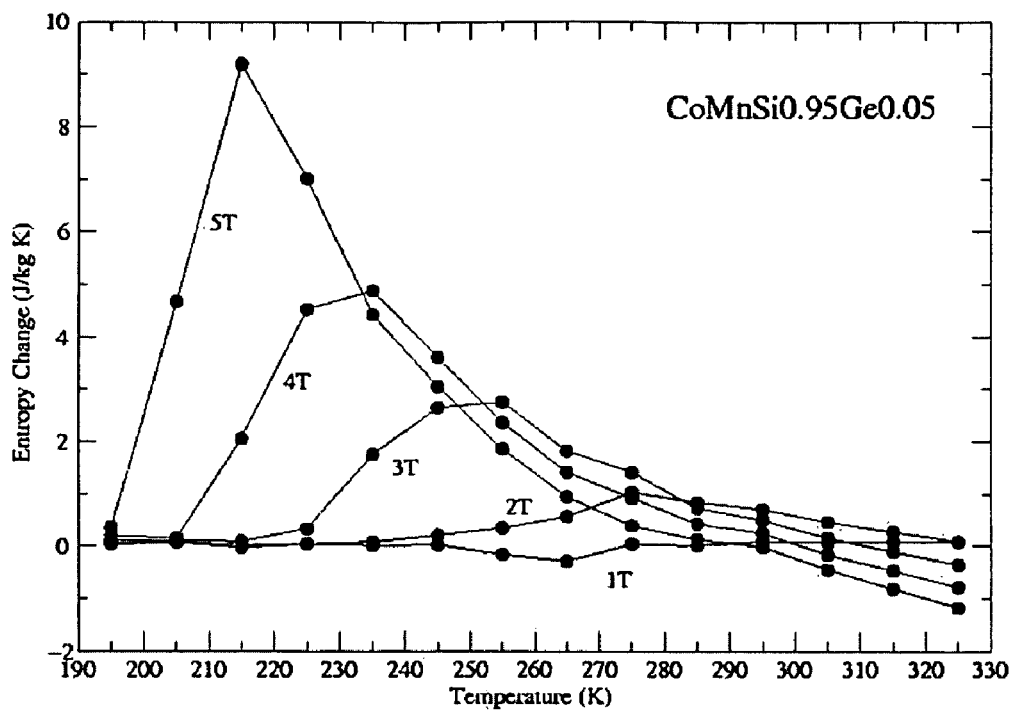
FIG. 5 shows the entropy change, $\Delta S$, of the material of Example 2 caused by the application of magnetic fields of up to 5 Tesla.

FIG. 5 shows the entropy change ΔS of the material CoMnSi$_{0.95}$Ge$_{0.05}$ caused by the application of magnetic fields of up to 5 Tesla. As in FIG. 3, this data is derived from magnetisation data. The magnetocaloric effect is comparable to that in CoMnSi, but Ge substitution reduces the fields and temperatures required for the metamagnetic transition relative to those in CoMnSi. This results in a shift of the observed temperature range of the magnetocaloric effect and a slight increase in the magnetocaloric effect seen at lower fields.

Figure 6:
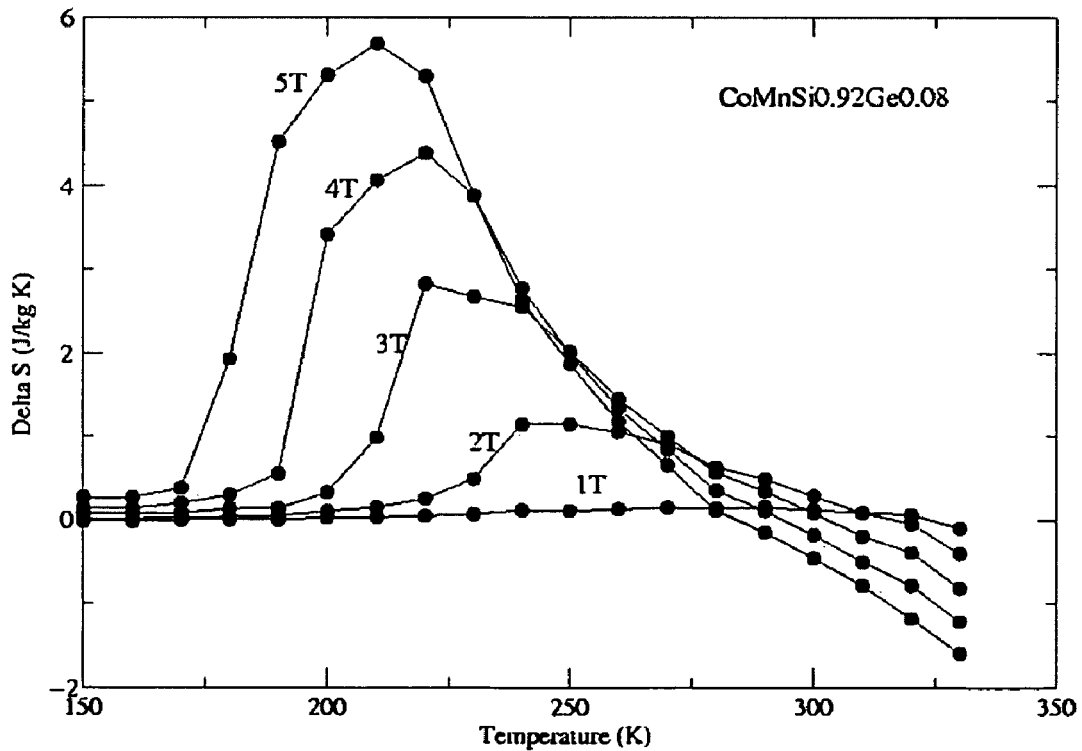
FIG. 6 shows the entropy change, $\Delta S$, of the material of Example 3 caused by the application of magnetic fields of up to 5 Tesla.

FIG. 6 shows the entropy change ΔS of CoMnSi$_{0.92}$Ge$_{0.08}$ caused by the application of magnetic fields of up to 5 Tesla. As in FIGS. 3 and 5, this data is derived from magnetisation data. As in the Example 2 material, the magnetocaloric effect is comparable to that in CoMnSi, and the greater level of Ge substitution for Si relative to Example 2 has further shifted the observed temperature range of the magnetocaloric effect.

Figure 7:
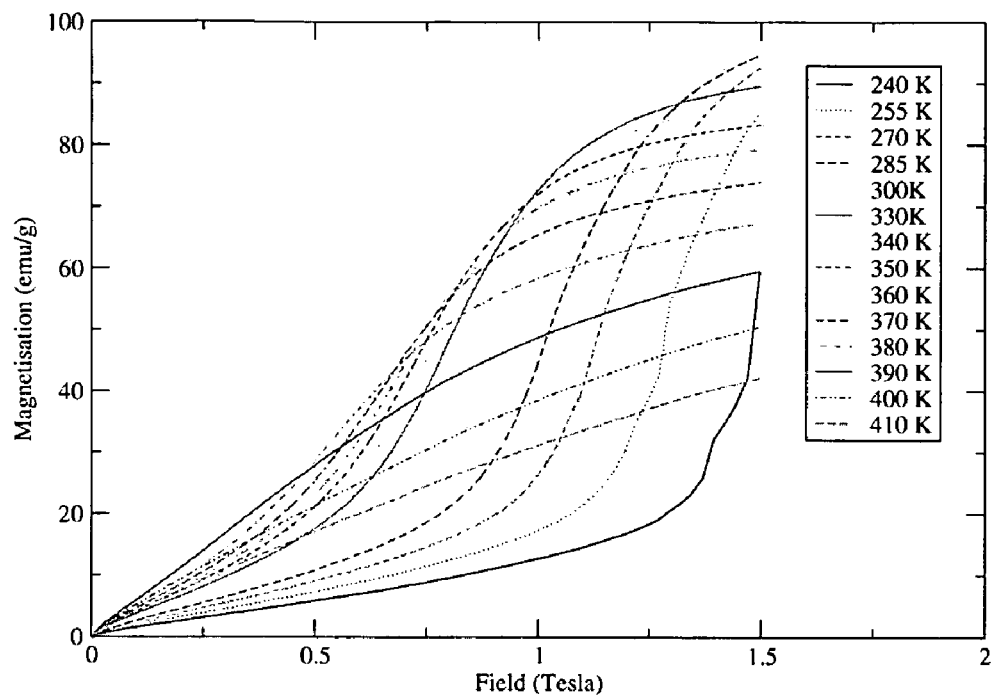
FIG. 7 shows the field dependence for $Co_{0.95}Ni_{0.05}MnSi$ used in the invention.

FIG. 7 is a graph of magnetisation vs. applied field Cu$_{0.95}$Ni$_{0.05}$MnSi showing critical fields near 1 Tesla at room temperature, representing a reduction compared to stoichiometric CoMnSi.

Figure 8:
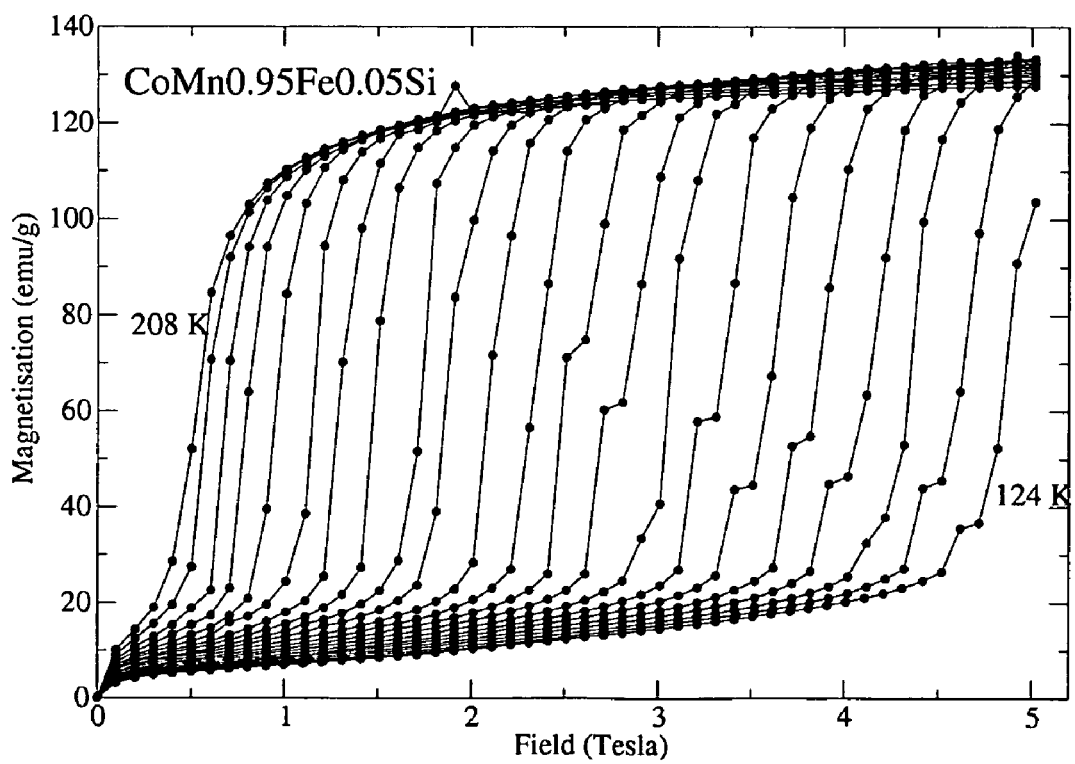
FIG. 8 shows the field dependence of the magnetisation of $CoMn_{0.95}Fe_{0.05}Si$.
Figure 9:
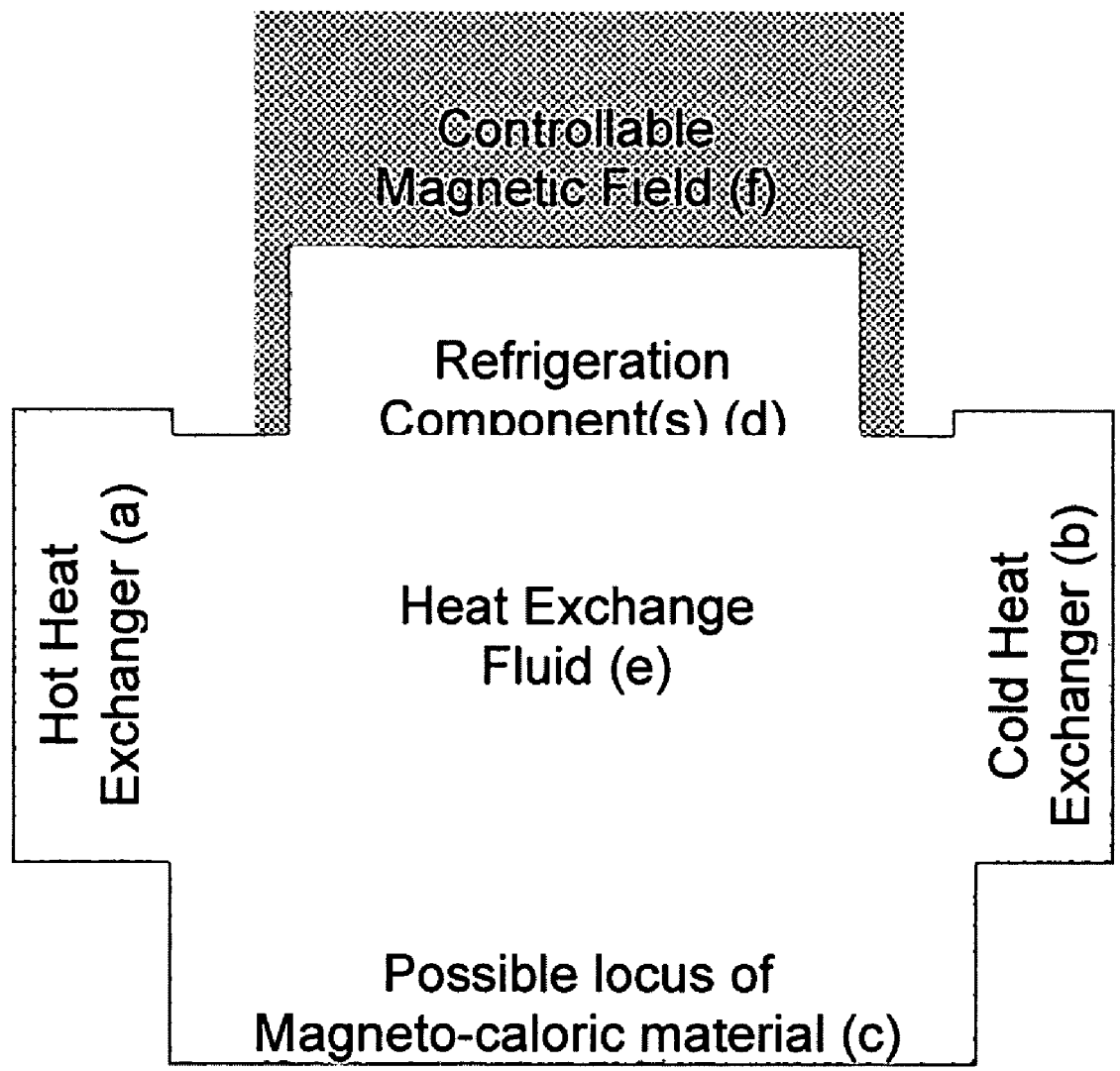
FIG. 9 is a schematic diagram of a device according to the invention.

FIG. 8 shows a graph for CoMn$_{0.95}$Fe$_{0.05}$Si of isothermal magnetisation vs. applied field showing critical fields near or below 1 Tesla at around 200 K. Data is shown for the temperature range 124 K to 208 K in steps of 4 K. This data is of relevance to refrigeration applications operating over temperature ranges well below room temperature.

The invention claimed is:

1. A process for preparing a material of general formula (I) comprising the following steps:
   (a) providing Co, Mn, Si, and optionally A, B and C, in amounts sufficient to produce a material of formula (I):

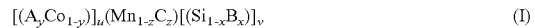
   $$[(A_y Co_{1-y})]_u (Mn_{1-z} C_z)[(Si_{1-x} B_x)]_v \qquad (I)$$

wherein:
   A is selected from Ni, Cr, Fe, Al, P, Se, Ga and Sb and mixtures thereof;
   B is selected from Ge, Sn, Al, P, Se, Ga and Sb and mixtures thereof;
   C is selected from Ni, Cr, Fe, Al, P, Se, Ga and Sb and mixtures thereof;
   x, y and z are the same or different and are numbers in the range 0 to 0.2; and
   u and v are the same or different and are numbers in the range 0.5 to 1.5;
   (b) co-melting the metals provided in step (a) under an inert atmosphere;
   (c) cooling the mixture of molten metals;
   (d) annealing the material at a temperature of from 825 to 975° C.;
   (e) slowly cooling the material from step (d) to 825° C. or below; and
   (f) optionally, if the material from step (e) is above room temperature, further cooling the material to room temperature.

2. A process as claimed in claim 1 wherein the metals in step (a) are provided in elemental form.

3. A process as claimed in claim 1 wherein the annealing time is greater than 10 hours.

4. A process as claimed in claim 1 wherein the annealing temperature is in the range 850 to 975° C., more preferably from 855 to 955 ° C., most preferably from 900 to 955° C.

5. A process as claimed in claim 1 wherein in step (e) the material is slowly cooled to a temperature of 800° C. or below.

6. A process as claimed in claim 1 wherein in step (e) the material is cooled at a rate of up to about 1° C. per minute, more preferably at a rate of up to about 0.5° C. per minute.

7. A magnetocaloric material produced according to the process of claim 1.

8. A material of general formula (I):

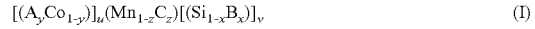
$$[(A_y Co_{1-y})]_u (Mn_{1-z} C_z)[(Si_{1-x} B_x)]_v \qquad (I)$$

wherein the material is orthorhombic and wherein:
A is selected from Ni, Cr, Fe, Al, P, Se, Ga and Sb and mixtures thereof;
B is selected from Ge, Sn, Al, P, Se, Ga and Sb and mixtures thereof;
C is selected from Ni, Cr, Fe, Al, P, Se, Ga and Sb and mixtures thereof;
x, y and z are the same or different and are numbers in the range of from 0 to 0.2 with the proviso that at least one of x, y and z is greater than zero; and
u and v are the same or different and are numbers in the range of from 0.5 to 1.5.

9. A material as claimed in claim 8 wherein at least one of x, y and z is greater than 0.01, more preferably greater than 0.03.

10. A magnetic refrigeration device comprising a magnetocaloric material as defined in claim 8.

11. A magnetocaloric refrigeration device as claimed in claim 10 which further comprises: (a) a first heat exchanger; (b) a second heat exchanger; (c) a heat exchange fluid; (d) one or more refrigeration components which contain at least a portion of the magnetocaloric material and which are arranged such that when the magnetocaloric material is within the refrigeration components it is in heat exchange contact with the heat exchange fluid; (e) means for providing a controlled magnetic field across the refrigeration components(s); and wherein the heat exchange fluid allows heat transfer to occur with the first and second heat exchangers and the refrigeration component(s).

12. A method of providing a heating or refrigerating effect to a heat load which comprises:

(i) providing a magnetocaloric material of formula (I):

$$[(A_y Co_{1-y})]_u (Mn_{1-z} C_z)[(Si_{1-x} B_x)]_v \qquad (I)$$

as a magnetocaloric material, wherein the material is orthorhombic and wherein:

A is selected from Ni, Cr, Fe, Al, P, Se, Ga and Sb and mixtures thereof;

B is selected from Ge, Sn, Al, P, Se, Ga and Sb and mixtures thereof;

C is selected from Ni, Cr, Fe, Al, P, Se, Ga and Sb and mixtures thereof;

x, y and z are the same or different and are numbers in the range of from 0 to 0.2; and u and v are the same or different and are numbers in the range of from 0.5 to 1.5;

(ii) applying to said magnetocaloric material a magnetic field in order to cause said magnetocaloric material to increase or reduce in temperature; and (iii) allowing heat to transfer either (i) from the magnetocaloric material to the heat load where the temperature of the magnetocaloric material is increased, or (ii) from the heat load to said magnetocaloric material where the temperature of the magnetocaloric material is reduced.

13. A method as claimed in claim 12 wherein the magnetic field is a changing magnetic field and wherein the method additionally comprises providing a heat exchange fluid, wherein when the magnetocaloric material rises in temperature the heat generated is transferred from the magnetocaloric material to the heat exchange fluid, or wherein when the magnetocaloric material reduces in temperature heat is transferred from the heat exchange fluid to the magnetocaloric material.

14. A method according to claim 12 wherein x and/or y and/or z are numbers in the range of from 0 to 0.1.

15. A method according to claim 12 wherein x, y and z are zero.

16. A method according to claim 12 wherein at least one of x, y and z is greater than zero.

17. A method according to claim 12 wherein one of x, y and z is zero and the other two of x, y and z are greater than zero, or wherein one of x, y and z is greater than zero and the other two of x, y and z are zero.

18. A method according to claim 12 wherein x is from 0 to 0.1 and/or y is from 0 to 0.1 and/or z is from 0 to 0.1.

19. A method according to claim 12 wherein A is selected from Ni and Fe and mixtures thereof.

20. A method according to claim 12 wherein B is selected from Ge and Sn and mixtures thereof.

21. A method according to claim 12 wherein C is Fe.

22. A method according to claim 12 wherein the material is of general formula (II):

$$(A'_y CO_{1-y})_u Mn(Si_{1-x} B'_x)_v \qquad (II)$$

wherein A' is selected from Ni and Fe and mixtures thereof, B is selected from Ge and Sn and mixtures thereof, x is a number in the range 0 to 0.2, y is a number in the range 0 to 0.2, u is a number in the range 0.5 to 1, and v is a number in the range 0.5 to 1.

23. A method according to claim 12 wherein the material is of general formula (IV):

$$Co_u (Mn_{1-z} C'_z) Si_v \qquad (IV)$$

wherein C is selected from Ni, Cr, Fe, Al, P, Se, Ga and Sb and mixtures thereof, z is a number in the range 0 to 0.2, u is a number in the range 0.5 to 1.5 and v is a number in the range 0.5 to 1.5.

24. A method according to claim 22 wherein u and v are both 1.

25. A method according to claim 23 wherein u and v are both 1.

* * * * *